United States Patent [19]

de Vall

[11] Patent Number: 5,523,750
[45] Date of Patent: Jun. 4, 1996

[54] TRANSPONDER SYSTEM FOR COMMUNICATING THROUGH AN RF BARRIER

[75] Inventor: Franklin B. de Vall, Boulder, Colo.

[73] Assignee: Palomar Technologies Corporation, Carlsbad, Calif.

[21] Appl. No.: 316,194

[22] Filed: Sep. 30, 1994

[51] Int. Cl.$^6$ .................................................. G08C 19/06
[52] U.S. Cl. ........................ 340/870.31; 340/825.54; 340/825.69; 455/41; 343/787; 343/873
[58] Field of Search ..................... 340/870.31, 870.32, 340/870.01, 825.54, 825.69, 825.72; 455/41, 269, 272, 274; 343/725, 785, 787, 850, 856, 872, 873, 912

[56] References Cited

U.S. PATENT DOCUMENTS

| | | | |
|---|---|---|---|
| 3,761,938 | 9/1973 | Reggia | 343/787 |
| 4,730,188 | 3/1988 | Milheiser | 340/825.69 |
| 4,983,963 | 1/1991 | Hodgetts et al. | 340/870.31 |

*Primary Examiner*—John K. Peng
*Assistant Examiner*—Andrew Hill

[57] ABSTRACT

RF communication through an RF barrier is facilitated by an RF field concentrating core that is lodged within an opening through the barrier and extends out from at least one side of the barrier. An antenna coil is wound around the core, with a capacitor connected across the coil to establish a parallel resonant circuit at the exciting frequency. The core/coil combination provides a bidirectional RF coupler for transmitting signals between opposite sides of the barrier. It is particularly useful for transponder systems in which a transponder is located within an RF-blocking enclosure, and is interrogated by an exciter/reader outside the enclosure.

19 Claims, 2 Drawing Sheets

TRANSPONDER SYSTEM FOR COMMUNICATING THROUGH AN RF BARRIER

BACKGROUND OF THE INVENTION

1. Field of the Invention

This invention relates to transponder systems in which an RF signal excites a transponder to transmit a responsive signal, and more particularly to transponder systems that communicate through barriers to RF transmission.

2. Description of the Related Art

RF transponder systems are commonly used to identify an object associated with the transponder, and/or to communicate various types of information about the object back to a receiving station. Such systems typically employ an exciter/reader that transmits an RF excitation signal, and a transponder that is energized by the excitation signal to transmit an identification code or other information back to the exciter/reader. Transponder cards are also used to protect clothing and other merchandise from theft, in which case the mere presence of the object rather than its particular identification is transmitted back.

The transponders typically use a single antenna coil to both receive the excitation signal, and transmit back an information signal. The exciter/reader typically also uses a single antenna to both transmit the excitation signal and receive the information signal, although these functions can be separated if desired. A known transponder system is described in U.S. Pat. No. 4,730,188 to Milheiser.

The situation is complicated if the exciter/reader and transponder are separated by a barrier to RF transmission. For example, transponders with appropriate identifying codes can be positioned inside metal containers such as gas and air bottles, milk cans and chemical containers. These containers would normally block any attempt to transmit an RF signal to a transponder on the inside, or to transmit back an identification code. Transponders can also be used for machine tool identification in connection with computer numerical control machines, such as milling machines, that roboticly select among different tools. A transponder with a unique identification code is positioned internally within each tool to make sure the machine picks up the proper tool.

RF communication with a transponder within an RF-blocking enclosure has previously been accomplished by providing three separate coils: one mounted on the outside of the enclosure, a second on the inner surface of the enclosure wall, and the transponder coil itself within the interior of the enclosure. The coils mounted on the inside and outside of the enclosure wall are connected by a wire that extends through an opening in the wall. RF signals from an exciter/reader are received by the outside coil, transmitted along the wire through the opening to the second coil, and radiated from the second coil through an air gap to the final transponder coil; the return signal back to the exciter/reader follows the same path but in the opposite direction.

The additional coils required by this approach are subject to physical abuse, particularly the coil that is mounted outside the enclosure. The interconnecting wires between the outside and inside coils must also be protected. In addition, the extra coils are relatively large in size and can require that extra care be exercised when handling the enclosure.

SUMMARY OF THE INVENTION

The present invention seeks to provide a transponder system that is capable of communicating through an RF barrier with a simple yet sturdy transmission mechanism that is not subject to breakage, and provides an effective transmission medium to a transponder within an enclosure.

These goals are achieved by lodging an RF field concentrating core within an opening through the enclosure wall, and winding an antenna coil around a section of the core that extends out from at least one side of the enclosure wall. The core and antenna coil provide a bidirectional RF transmission path between an exciter/reader outside the enclosure and a transponder within the enclosure.

The core can extend out from either one or both sides of the RF barrier, with the antenna coil preferably wound around a substantial majority of the portion of the core which extends outside the barrier opening. The coil can also be wound around a portion of the core inside the barrier opening, in which case an insulator is provided between the coil and barrier if the barrier is electrically conductive.

In one embodiment the core extends substantially all the way through the barrier opening, with its outer end substantially flush with the outer barrier surface. In another embodiment the core extends out from both sides of the barrier by approximately equal amounts. An effective RF transmission within the enclosure is achieved for a generally planar transponder winding when the core axis is generally parallel to but laterally offset from the plane of the transponder winding. To obtain a resonant circuit at a desired RF exciting frequency, a capacitor can be connected across all or a portion of the antenna coil.

These and other features and advantages of the invention will be apparent to those skilled in the art from the following detailed description, taken together with the accompanying drawings.

DETAILED DESCRIPTION OF THE INVENTION

Figure 1:
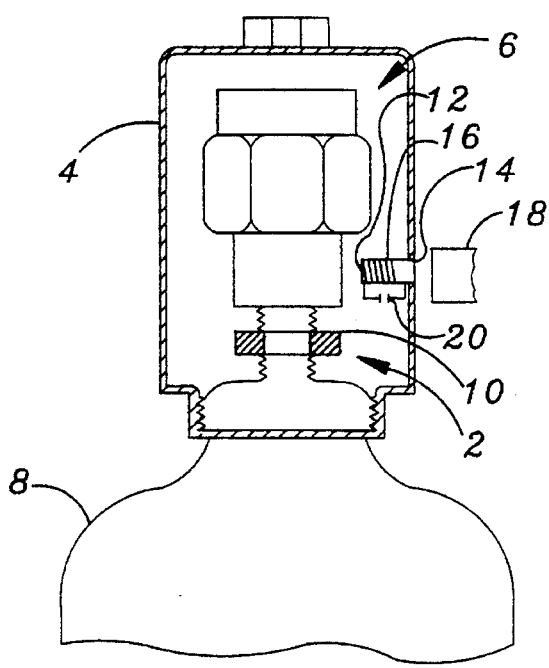
FIG. 1 is a partially sectioned view illustrating the transponder system installed in a gas bottle cap.

One embodiment of the invention is illustrated in FIG. 1, in which the transponder system of the invention is employed for communicating with a transponder 2 within an iron protective cap 4 that encloses the valve assembly 6 on a gas bottle 8. The transponder 2 is illustrated as a washer-like member 10 in which an antenna winding, IC chip and resonating capacitor are embedded. Other types of transponders, such as discrete coils wound around a ferrite core, "button" transponders or planar transponders, can also be used.

The cap 4 is typically formed from cast iron, and encloses a brass valve assembly. This would normally prevent the transponder 2 from receiving RF signals transmitted from outside the cap. The transponder includes a chip that is energized when the winding 10 receives an RF excitation signal at the exciting frequency, and retransmits an RF identification code (or other desired information, such as the gas pressure). However, some mechanism must be provided to admit the exciting RF signal into the interior of the cap, and to pass the information signal from the transponder out of the cap. Otherwise, the electro-magnetically conductive cap would effectively block RF communication between the outside and its interior.

To provide an RF communication path through the barrier presented by the cast iron cap, an RF field concentrating core 12 is inserted into an opening 14 through the cap. The core 12 is shown as extending into the interior of the cap, and is wound with an antenna coil 16 that essentially acts as an RF relay between a reader/exciter 18 outside the cap, and the transponder winding within the cap. A capacitor 20 is connected across the core winding 16 to form a tuned circuit that resonates at the excitation frequency of the exciter/reader. The core 12 responds to an RF excitation signal from the exciter/reader 18 and couples the excitation signal to the coil 16. This coil in turn radiates the RF signal within the interior of the cap 4, coupling the core 12 with the transponder winding 10. The core 12 and antenna coil 16 thus provide an RF transmission path between the transponder winding 10 and an exciter/reader 18 outside the enclosure.

The core 12 is preferably implemented with a low loss ferrite material such as Philips 3F3. A dielectric insulating layer should be provided between the core and coil. The core is held in place either with an adhesive, or by press fitting, when contained by a plastic sleeve.

Up to a point, increasing the number of turns in coil 16 increases the coupling efficiency and Q of the core circuit. However, increasing the number of turns also increases the resistance and self-capacitance of the coil 16, which eventually results in a reduction in the circuit's Q. An optimum number of coil turns for maximum Q can be determined empirically for different applications.

Trade-offs are also involved in the selection of a wire size for the coil winding. Normally, a larger size wire is preferred because it reduces the winding resistance. However, a larger diameter wire will reduce the number of available turns for the coil, which can be a significant handicap for a limited length core. To increase the effective wire surface area, which is where most of the RF energy travels, Litz wire can be employed.

Figure 2:
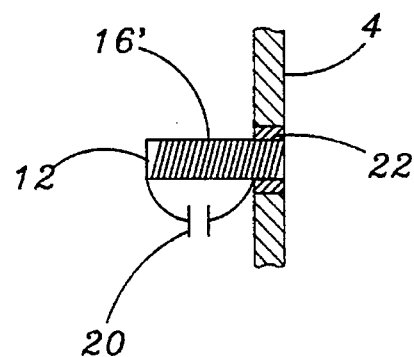
FIG. 2 is a fragmentary sectional view of an alternate embodiment in which an antenna winding is provided over substantially the full length of the core.

To maximize its RF coupling, the coil 16 should extend over a substantial majority of the core that extends out of the opening in the cap wall. The coil can be extended over substantially the full length of the core 12, including the portion of the core within the opening in the cap wall, as indicated by coil 16' in FIG. 2. In other applications optimum coupling is achieved when a coil extends over approximately two-thirds of the core, but a precise optimum coil coverage for purposes of the present invention has not yet been determined. A dielectric spacer 22 or other insulating mechanism is employed to electrically isolate the coil 16' from the cap wall, if the wall is electrically conductive, and also to provide a degree of electromagnetic insulation. Similar electrical isolation would be provided to isolate the core from a conductive cap wall even if the coil 16 does not extend into the opening in the wall.

Figure 3:
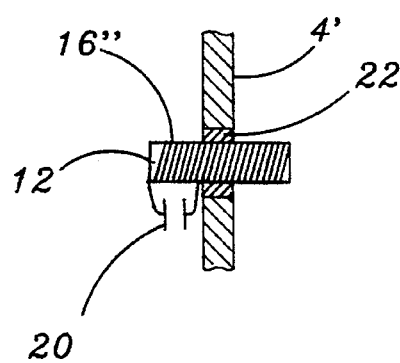
FIG. 3 is a fragmentary sectional view of another embodiment in which the core and winding extend out from the opposite sides of an RF barrier by approximately equal amounts.

The outer end of the core 12 is preferably approximately flush with the outer surface of the cap wall 4. This prevents any protrusion of the core outside the cap that could be subject to damage or interfere with handling the cap. However, in applications where a protrusion of the core outside the RF barrier is not a problem, the core can extend out from the opening on both sides of a barrier 4', as illustrated in FIG. 3. In this case the best RF coupling may be obtained when the core 12 extends out from the opposite sides of the barrier by approximately equal amounts, with the winding 16" extending along most or all of the core length.

Figure 4:
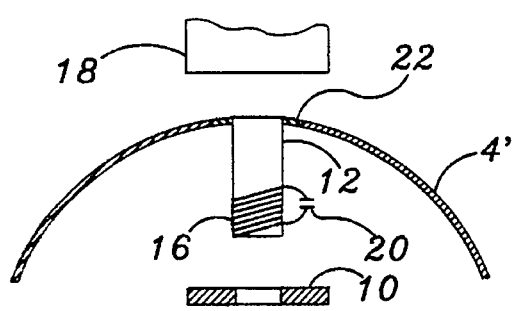
FIG. 4 is a fragmentary sectional view illustrating a different orientation of the transponder system.

The relative orientations of the core 12 and transponder winding 10 affects the RF coupling between these two elements. Tests were performed to compare an orientation similar to that of FIG. 1, in which the transducer winding is generally planar and the core was a rod whose axis was parallel to but laterally offset from the plane of the transducer winding, with the orientation illustrated in FIG. 4. In the latter case the same core 12 with its antenna coil 16 was lodged in an opening through another conductive enclosure 4' with the core 12 and transducer washer winding 10 coaxial, i.e., the core was centered over the transponder winding with its axis perpendicular to the plane of the transponder winding. A 1.27 cm diameter core from Fair Rite, Inc. number 77 ferrite material was employed, with a length of about 3.8 cm and wound towards one end with 100 turns of 32 AWG copper wire. The coil had an inductance of 648 microhenrys, and was tuned to an excitation frequency of 125 KHz with a 2500 pF parallel capacitor 20. The resonant circuit's Q was 29. The transponder coil 10 had 250 turns, with an outside diameter of 4.76 cm. The exciter/reader 18 had a 2.54 cm diameter ferrite rod coil on a cable that was attached to an industrial single channel reader.

With the reader coil held near the outer end of the rod 12, acceptable return signals were received from the transponder for the configuration of FIG. 1 when the lower edge of the core 12 was offset up to 1.9 cm above the upper surface of the transponder washer, and the inward (left) end of the core 12 was offset up to 3.17 cm to the right of the transponder winding's right hand edge. With the orientation of FIG. 4, by contrast, valid return transponder readings were not obtained beyond a vertical offset between the core 12 and transducer winding 10 of about 1.9 cm, and to obtain this the exciter/reader had to be held within about 0.64 cm of the upper end of core 12.

The transponder would typically include an IC chip that generates an identification code in a conventional manner, such as that described in the Milheiser patent mentioned above. Suitable circuitry for the transponder chip 24 and the exciter/reader 18 are illustrated in block diagram form in FIG. 5. The circuitry employed by the exciter/reader 18 is shown as consisting of three main functional units: an exciter 26, a signal conditioner 28 and a demodulation and detection circuit 30. The exciter 26 consists of an AC signal source 32, followed by a power driver 34 which provides a high current excitation signal to an interrogator antenna coil 36 through a capacitor 38. The interrogator coil 36 and the capacitor 38 are selected to resonate at the excitation signal frequency, so that the current through the coil is maximized.

The signal conditioner 28 connects to the interrogator coil 36 and serves to amplify the identification signal returned from the transponder, while filtering out the excitation signal frequency as well as other noise and undesired signals outside the frequency range used by the transponder signals. It includes a bandpass filter/bandstop filter 40 that actively passes the identification code signal frequencies returned from the transponder and passively excludes the high energy at the excitation frequency, and an amplifier 42.

The amplified output of the signal conditioner 28 is fed to the demodulation and detection unit 30, which includes a frequency shift keyed (FSK) demodulator 44 and a microcomputer 46. The FSK demodulator 44 is a phase-locked loop circuit, configured as a tone decoder, which gives a digital output as a signal from the transponder shifts between two frequencies. The microcomputer 46 extracts the identification code from this digital output by observing the timing of transitions between the two logic levels. The identification code obtained by the microcomputer 46 can be transferred to a display or printer, sent over communication lines to a remote point, stored on tape, disk or other storage medium, or sent to another computer.

As illustrated, the relay core 12 with its tuned coil 16 and capacitor 20 serves as an RF communications link between the exciter/reader coil 36 and the transponder winding 10. The transponder winding couples energy from the coil 16 at the excitation frequency into the transponder circuit 24. This energy is converted to a DC voltage by a full-wave rectifier bridge 46 and a smoothing capacitor 48, which are commonly used in power supply circuits. The DC voltage supplies power to a control logic and identification memory circuit 50.

The control logic 50a consists of counters and gates that sequentially read out the contents of the identification memory 50b. The logic 50a also inserts a sync word into the signal data stream to allow the exciter/reader to synchronize to the data. The excitation signal which appears on the transponder coil 10 is supplied to the control logic to provide a clock signal. The control logic circuit 50a converts the serial data and sync stream into an FSK waveform which is connected to the transponder winding 10 through complementary current syncs to transmit the FSK identification signal. The transmitted identification signal is relayed by winding 16, capacitor 20 and core 12 to the exciter/receiver coil 36, and is amplified by the signal conditioner 28 and detected. The components of the exciter/reader 18 can be implemented as either different units which are connected to one another, or wired together as a single unit.

Figure 5:
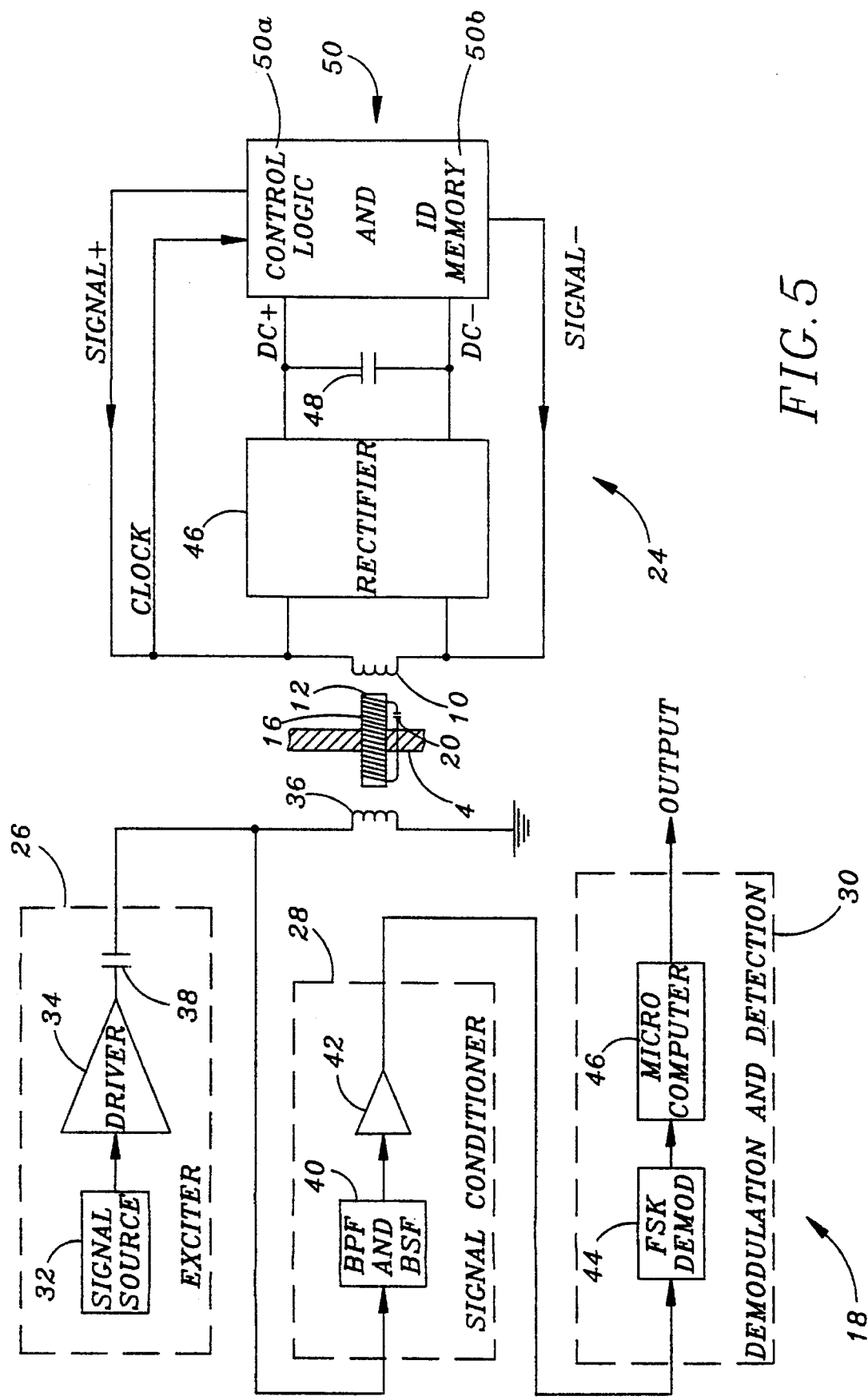
FIG. 5 is a schematic diagram of exciter/reader and transponder circuitry that can be used with the invention.

The exciter/reader and transponder circuitry of FIG. 5 is shown only for purposes of illustration; other circuit configurations could also be employed. In each case, however, a field concentrating core 12 with an attendant winding circuit 16 would be employed to provide a transmission path through an RF barrier.

While different embodiments of the invention have been shown and described, numerous variations and alternate embodiments will occur to those skilled in the art. Accordingly, it is intended that the invention be limited only in terms of the appended claims.

I claim:

1. A transponder system, comprising:

a transponder winding for receiving a radio frequency (RF) exciting signal and transmitting a return signal in response to the exciting signal, a barrier which limits mechanical and RF access to said transponder winding, with said transponder winding on one side of the barrier, said barrier including an opening, a RF field concentrating core lodged within said barrier opening, said core extending out from said barrier opening on the transponder winding side of the barrier, and a tuned circuit that is tuned to said RF exciting signal and includes an antenna coil that is wound around and positionally fixed with respect to said core on the transponder winding side of said barrier and is separated from said said transponder winding by an air gap, said core coupling RF signals through said barrier between said antenna coil and the opposite side of the barrier from said antenna coil, and said antenna coil radiating RF transmissions from said core to said transponder winding across said air gap and relaying radiated transmissions across said air gap from said transponder winding to said core, said core and antenna coil providing an RF transmission path between said transponder winding and the opposite side of the barrier.

2. The transponder system of claim 1, wherein said core extends substantially all the way through said barrier opening and has an end that is substantially flush with the barrier surface on the opposite side of said barrier from said transponder winding.

3. The transponder system of claim 1, wherein said core extends out from said barrier opening on opposite sides of the barrier by approximately equal amounts.

4. The transponder system of claim 1, said barrier comprising an electrically conductive enclosure for said transponder winding.

5. The transponder system of claim 1, wherein said antenna coil is wound around a substantial majority of the portion of said core which extends outside said barrier opening.

6. The transponder system of claim 1, wherein said antenna coil is also wound around a portion of said core which is inside said barrier opening.

7. The transponder system of claim 6, wherein said barrier is formed from an electrically conductive material, further comprising an insulator between said barrier and the portion of said antenna coil inside said barrier opening.

8. The transponder system of claim 1, wherein said transponder winding is generally planar, and said core extends along an axis generally parallel to the transponder winding plane.

9. The transponder system of claim 8, wherein said core axis is laterally offset from said transponder winding plane.

10. The transponder system of claim 1, said tuned circuit further comprising a capacitor connected across said antenna coil, said capacitor and antenna coil cooperating to yield a parallel resonant circuit at a predetermined excitation signal frequency.

11. A radio frequency (RF) coupler, comprising:

a barrier with opposite sides that limits the transmission of RF signals, said barrier including an opening between said opposite sides, an RF field concentrating core lodged within said opening and extending out from at least one side of said barrier, and a tuned circuit that is tuned to a predetermined RF frequency and includes an antenna coil wound around and positionally fixed with respect to at least a portion of said core out-side said opening on one side of the barrier to radiate, on said one side of the barrier, RF signals received by the antenna coil from said core at said predetermined frequency, and to receive RF signals radiated towards the antenna coil from said one side of the barrier, said core and antenna coil providing an RF transmission path between the opposite sides of said barrier.

12. The RF coupler of claim 11, wherein said core extends out from only one side of said barrier opening.

13. The RF coupler of claim 12, wherein said core extends substantially all the way through said barrier opening and has an end that is substantially flush with the other side of the barrier from said one side.

14. The RF coupler of claim 11, wherein said core extends out from said barrier opening on opposite sides of the barrier by approximately equal amounts.

15. The RF coupler of claim 11, wherein said barrier is electrically conductive.

16. The RF coupler of claim 11, wherein said antenna coil is wound around a substantial majority of the portion of said core which extends outside said barrier opening.

17. The RF couple of claim 11, wherein said antenna coil is also wound around a portion of said core which is inside said barrier opening.

18. The RF coupler of claim 17, wherein said barrier is formed from an electrically conductive material, further comprising an insulator between said barrier and the portion of said antenna coil inside said barrier opening.

19. The RF coupler of claim 11, said tuned circuit further comprising a capacitor connected across said antenna coil, said capacitor and antenna coil cooperating to yield a parallel resonant circuit at a predetermined excitation signal frequency.

* * * * *

UNITED STATES PATENT AND TRADEMARK OFFICE
CERTIFICATE OF CORRECTION

PATENT NO. : 5,523,750
DATED : June 4, 1996
INVENTOR(S) : Franklin B. de Vall

It is certified that error appears in the above-indentified patent and that said Letters Patent is hereby corrected as shown below:

Column 5, line 57, delete "a" and insert --an--.

Column 5, line 65: delete "said said" and insert --said--.

Signed and Sealed this

Thirteenth Day of August, 1996

Attest:

BRUCE LEHMAN

Attesting Officer      Commissioner of Patents and Trademarks